United States Patent
Pianigiani (10) Patent No.: US 11,233,714 B2
(45) Date of Patent: Jan. 25, 2022

(54) VALIDATION OF A USER-DEFINED CABLING PLAN FOR A COMPUTER NETWORK BASED ON A PHYSICAL CABLING TOPOLOGY

(71) Applicant: Juniper Networks, Inc., Sunnyvale, CA (US)

(72) Inventor: Jacopo Pianigiani, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 16 days.

(21) Appl. No.: 16/520,126

(22) Filed: Jul. 23, 2019

(65) Prior Publication Data

US 2021/0029006 A1  Jan. 28, 2021

(51) Int. Cl.
*H04L 12/26* (2006.01)
*H04L 12/24* (2006.01)

(52) U.S. Cl.
CPC ........ *H04L 43/0811* (2013.01); *H04L 41/082* (2013.01); *H04L 41/0893* (2013.01); *H04L 41/12* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 10,083,026 B1 | 9/2018 | Venkata et al. | |
| 2006/0271677 A1* | 11/2006 | Mercier | H04L 43/0817 709/224 |
| 2010/0180322 A1* | 7/2010 | Finn | H04L 12/4625 726/4 |
| 2014/0105029 A1* | 4/2014 | Jain | H04L 43/0811 370/242 |
| 2014/0173685 A1* | 6/2014 | Bitties | H04L 41/00 726/1 |
| 2014/0280846 A1* | 9/2014 | Gourlay | H04L 63/0876 709/223 |
| 2014/0376402 A1* | 12/2014 | Dutt | H04L 41/0843 370/254 |

(Continued)

FOREIGN PATENT DOCUMENTS

| | | |
|---|---|---|
| WO | 2013184846 A1 | 12/2013 |
| WO | 2018100437 A1 | 6/2018 |

OTHER PUBLICATIONS

Extended Search Report from counterpart European Application No. 19199899.6, dated Mar. 19, 2020, 8 pp.

(Continued)

*Primary Examiner* — Gregory B Sefcheck
*Assistant Examiner* — Amarnauth G Persaud
(74) *Attorney, Agent, or Firm* — Shumaker & Sieffert, P.A.

(57) ABSTRACT

In some examples, a software-defined networking engine is configured to receive a user-defined cabling plan for a computer network and receive information indicative of a physical cabling topology for the computer network. The software-defined networking engine is also configured to determine a difference between the user-defined cabling plan and the physical cabling topology. The software-defined networking engine is further configured to output an indication of the difference between the user-defined cabling plan and the physical cabling topology.

20 Claims, 7 Drawing Sheets

(56) References Cited

U.S. PATENT DOCUMENTS

2016/0357416 A1* 12/2016 Abuduweili ............ H04L 41/12
2019/0296998 A1*  9/2019 Shaikh .................... H04B 3/32

OTHER PUBLICATIONS

Montero et al., "Dynamic Topology Discovery in SDN-enabled Transparent Optical Networks," 2017 International Conference on Optical Network Design and Modeling (ONDM), May 15-18, 2017, 6 pp.

"Contrail Architecture," White Paper, Juniper Networks, Inc., Sep. 2015, 44 pp.

Response to Extended Search Report dated Mar. 19, 2020, from counterpart European Application No. 19199899.6, filed Jul. 27, 2021, 25 pp.

* cited by examiner

VALIDATION OF A USER-DEFINED CABLING PLAN FOR A COMPUTER NETWORK BASED ON A PHYSICAL CABLING TOPOLOGY

TECHNICAL FIELD

The disclosure relates to the physical connections in a computer network.

BACKGROUND

The physical connections between network devices can be complex, especially in data centers and in the context of cloud computing. Fully installing and testing the cabling for a cloud computing application can take a substantial amount of time. A user must install the cabling and activate the connected devices to test whether the cabling has been installed correctly.

SUMMARY

In general, this disclosure describes techniques for validating a user-defined cabling plan for a computer network having a physical cabling topology obtained using a discovery protocol of a software-defined networking (SDN) controller. An SDN controller is a logically centralized, physically distributed controller used to define and construct virtual networks. Part of the operation of the SDN controller is to perform discovery of network devices and the connections among the network devices in the computer network. This disclosure describes example techniques to leverage the discovery operations performed by the SDN controller as a way to validate the user-defined cabling plan.

In one example, this disclosure describes a system includes a plurality of network devices that form a computer network that are interconnected by physical cabling. The system also includes an SDN controller configured to determine, using a discovery protocol, a physical cabling topology of the physical cabling for the computer network. The SDN controller is logically centralized and physically distributed and configured to construct an overlay virtual network on an underlay network formed by the physical cabling topology. The system further includes an SDN cabling validation engine configured to receive a user-defined cabling plan for the computer network. The SDN cabling validation engine also receives information indicative of the physical cabling topology. The SDN cabling validation engine is configured to determine a difference between the user-defined cabling plan and the physical cabling topology. Responsive to determining a difference between the user-defined cabling plan and the physical cabling topology, the SDN cabling validation engine then outputs an indication of the difference.

In one example, the disclosure describes a method that includes receiving, by an SDN cabling validation engine, a user-defined cabling plan for a computer network. The method also includes determining, by an SDN controller for the computer network and using a discovery protocol, a physical cabling topology for the computer network. The SDN controller is logically centralized and physically distributed and configured to construct an overlay virtual network on an underlay network formed by the physical cabling topology. The method further includes determining, by the SDN cabling validation engine, a difference between the user-defined cabling plan and the physical cabling topology. The method includes outputting, by the SDN cabling validation engine, an indication of the difference between the user-defined cabling plan and the physical cabling topology.

In one example, the disclosure describes a non-transitory computer-readable storage medium comprising instructions for causing programmable processing circuitry to receive a user-defined cabling plan for the computer network. The instructions are further configured to cause the processing circuitry to receive information indicative of a physical cabling topology determined by a software-defined networking controller using a discovery protocol. The SDN controller is logically centralized and physically distributed and configured to construct an overlay virtual network on an underlay network formed by the physical cabling topology. The instructions are also configured to cause the processing circuitry to determine a difference between the user-defined cabling plan and the physical cabling topology. The instructions are configured to cause the processing circuitry to output an indication of the difference between the user-defined cabling plan and the physical cabling topology.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
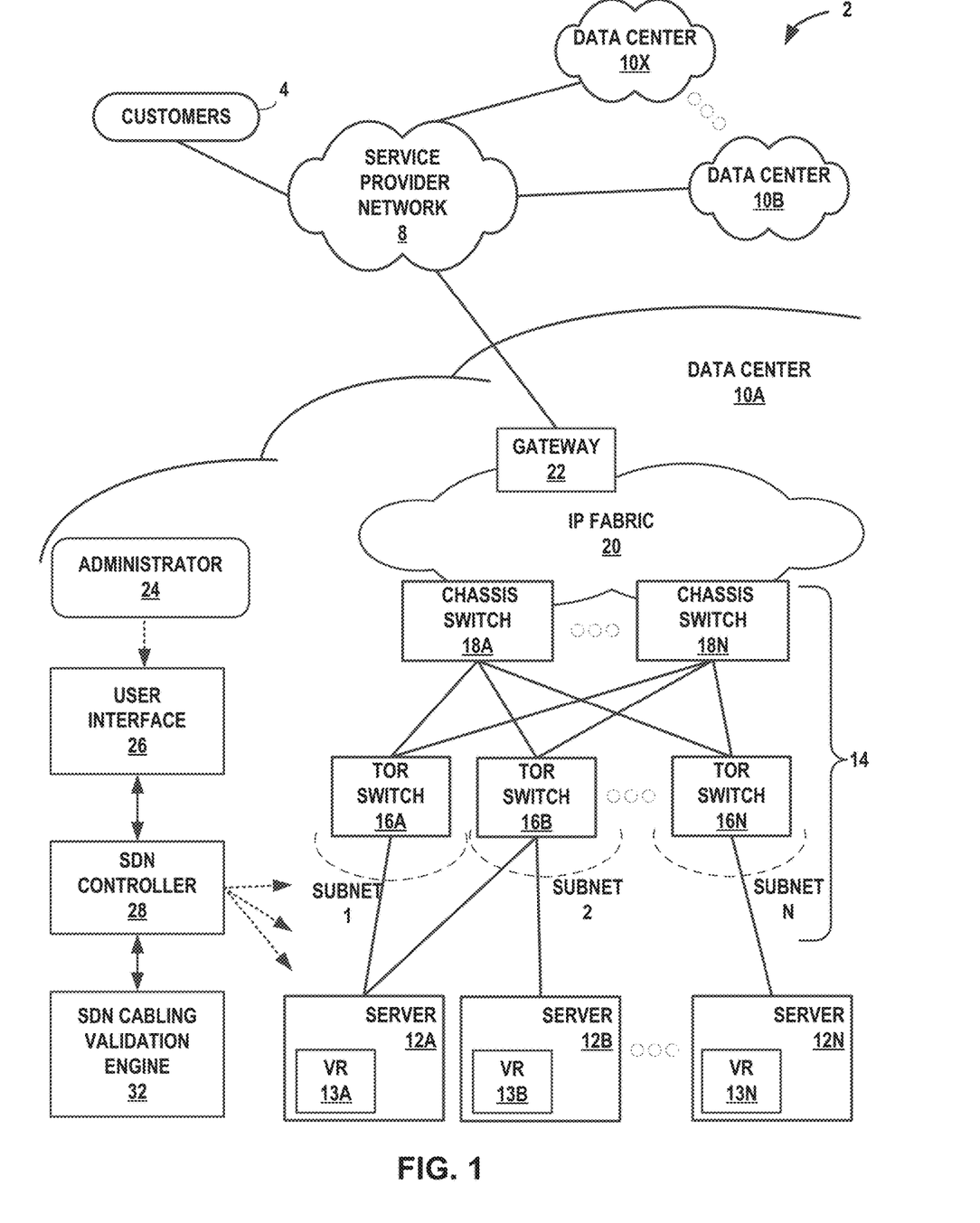
FIG. 1 is a block diagram illustrating an example network system including a software-defined networking (SDN) controller and an SDN cabling validation engine in which examples of the techniques described herein may be implemented.

FIG. 1 is a block diagram illustrating an example network system 2 including a software-defined networking (SDN) controller 28 and an SDN cabling validation engine 32 in which examples of the techniques described herein may be implemented. Network system 2 includes data centers 10A-10X (collectively, "data centers 10") interconnected with one another and with customer networks associated with customers 4 via a service provider network 8. In some examples, each data center 10 may represent one of many geographically distributed network data centers. In general, each data center 10 provides an operating environment for applications and services for customers 4 coupled to the data center by service provider network 8. Data centers 10 may, for example, host infrastructure equipment, such as networking and storage systems, redundant power supplies, and environmental controls. Service provider network 8 may be coupled to one or more networks administered by other providers, and may thus form part of a large-scale public network infrastructure, e.g., the Internet.

Customers 4 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some examples, each of data centers 10 may be individual network servers, network peers, or otherwise.

In this example, each of data centers 10 includes a set of storage systems and application servers 12A-12N (herein, "servers 12") interconnected via high-speed switch fabric 14 provided by one or more tiers of physical network switches and routers. Servers 12 function as physical compute nodes of the data center. In some examples, the terms "compute nodes" and "servers" are used interchangeably herein to refer to servers 12. For example, each of servers 12 may provide an operating environment for execution of one or more customer-specific virtual machines ("VMs"). Switch fabric 14 is provided by a set of interconnected top-of-rack (TOR) switches 16A-16N (collectively, "TOR switches 16") coupled to a distribution layer of chassis switches 18A-18N (collectively, "chassis switches 18"). Switch fabric 14 may be a part of an underlay network for a computer network including switches 16 and 18. Although not shown, each of data centers 10 may also include, for example, one or more non-edge switches, routers, hubs, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Servers 12, switches 16 and 18, and the other computing devices of data centers 10 are referred to herein as network devices.

In this example, TOR switches 16 and chassis switches 18 provide servers 12 with redundant (multi-homed) connectivity to IP fabric 20 and service provider network 8. Chassis switches 18 aggregate traffic flows and provides high-speed connectivity between TOR switches 16. TOR switches 16 may be network devices the provide layer two (e.g., media access control (MAC)) and/or layer 3 (e.g., IP) routing and switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customer devices 4 via service provider network 8.

Gateway device 22 may represent a router, switch, or other suitable edge network device that participates in a layer 2 virtual private network ("L2VPN") service, such as Ethernet Virtual Private Network (EVPN). Gateway device 22 redirects traffic flows to and from data centers 10 that provide network services. For example, gateway device 22 may implement EVPN that uses layer 2 overlays to interconnect multiple edges (e.g., virtual machines) within servers 12 of data center 10A. Gateway device 22 may also provide connectivity for a tenant network (e.g., virtual network) of data center 10A to a tenant network of one or more remote data centers, e.g., data center 10B-10X. For instance, gateway device 22 may provide transport reachability to a gateway device of remote data center 10B. As one example, gateway device 22 may implement a communication protocol, such as multiprotocol border gateway protocol (MP-BGP) or Internet Protocol Virtual Private Network (IP VPN), to communicate reachability of a tenant network of data center 10A to a gateway device of a remote data center. The capability to provide connectivity across tenant networks between data centers 10 is referred to as "data center interconnect."

Data centers 10 may include an SDN platform to control and manage network behavior. In some cases, an SDN platform includes a logically centralized and physically distributed SDN controller, e.g., SDN controller 28, and a distributed forwarding plane in the form of virtual routers, e.g., virtual routers 13A-13N (collectively, "virtual routers 13" or "VRs 13"), that extend the network from physical routers and switches in the data center switch fabric into a virtual overlay network hosted in virtualized servers. For example, virtual routers 13 may forward traffic between different virtual machines on the same physical host (e.g., server), and/or between virtual machines and the physical network (e.g., switch fabric 14, IP fabric 20). Although illustrated as virtual routers, servers 12 may alternatively, or additionally, include virtual switches or any virtual network device for routing network traffic. Various techniques may be used to transport packets within and across virtual networks over the physical network. Network devices of a data center may, for example, use one or more protocols to enable communication between the virtual network and the physical network. For example, the one or more protocols may include EVPN.

SDN controller 28 facilitates operation of one or more virtual networks within each of data centers 10, such as data center 10A. Virtual networks are logical constructs implemented on top of the physical network of a data center. In some examples, virtual networks may be implemented as a virtual private network (VPN), virtual LAN (VLAN), or the like. In some examples, SDN controller 28 may operate in response to configuration input received from user interface 26, which can receive user inputs from and present information to a user, such as network administrator 24. Additional information regarding SDN controller 28 operating in conjunction with other devices of data center 10A or other software-defined network is found in International Application Number PCT/US2013/044378, filed Jun. 5, 2013, and entitled "Physical Path Determination for Virtual Network Packet Flows," which is incorporated by reference as if fully set forth herein.

Virtual networks (VNs) can be implemented using a variety of mechanisms. For example, each VN could be implemented as a virtual LAN (VLAN), virtual private networks (VPNs), etc. VNs can also be implemented using two networks—a physical underlay network and a virtual overlay network for the machines of a computer network within network system 2. The role of the physical underlay network is to provide an "IP fabric"—the physical underlay network may provide unicast IP connectivity from any physical device (server 12, storage device, router, or switch 16 or 18) to any other physical device. An underlay network can provide uniform low-latency, non-blocking, high-bandwidth connectivity from any point in the computer network to any other point in the computer network. Servers 12 and switches 16 and 18 may not contain any per-tenant state, MAC addresses, IP address, or policies for virtual machines. The forwarding tables of servers 12 and switches 16 and 18 may only contain the IP prefixes or MAC addresses of the physical servers. Servers 12 or switches 16 and 18 that connect a virtual network to a physical network are an exception—these machine may contain tenant MAC or IP addresses. SDN controller 28 may be configured to construct an overlay virtual network on the underlay network formed by the physical connections among servers 12 and switches 16 and 18.

User interface 26 includes a display configured to present a graphical user interface to administrator 24. User interface 26 may include a monitor such as a liquid crystal (LCD) display, a light emitting diode (LED) display, and/or any other suitable display. User interface 26 may be part of a computer in data center 10A or part of a mobile device such as a mobile phone, tablet computer, laptop computer, any other suitable computing device, or any combination thereof, with a built-in display or a separate display. User interface 26 also includes an input device for receiving user inputs, for example, a touchscreen, touchpad, button, remote control, trigger, mouse, keyboard, microphone, and/or other input device. User interface 26 may also be part of computing device outside of data center 10A, which allows administrator 24 to remotely access SDN controller 28. User interface 26 may be coupled to a computing device configured to run SDN cabling validation engine 32.

In some examples, SDN controller 28 manages application-layer functions of data center 10 such as managing compute, storage, networking, and application resources executing on servers 12. For example, SDN controller 28 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. SDN controller 28 may connect a tenant's virtual network to some external network, such as the Internet or a VPN.

To validate proposed connections for a computer network within data center 10A, administrator 24 can create the actual, physical connections among servers 12 and switches 16 and 18 using ethernet cables, fiber optic cables, metal wires, and/or any other type of physical connectors. After the physical connections are installed by administrator 24, SDN controller 28 can determine a physical cabling topology for the computer network using a discovery protocol. To test the actual, physical connections among servers 12 and switches 16 and 18, administrator 24 activates servers 12 and switches 16 and 18 to determine whether the physical connections have been properly installed. However, administrator 24 can spend a substantial amount of time fully testing the physical connections by running the machines in a computer network and then troubleshooting any potential problems. Administrator 24 may detect a problem in the operation of the machines but be unable to determine the exact cause of the problem without investigating the issue.

In accordance with various techniques of this disclosure, SDN cabling validation engine 32 receives a user-defined cabling plan indicating proposed connections for the network devices in a computer network within data center 10A. SDN cabling validation engine 32 compares the user-defined cabling plan to a physical cabling topology for the computer network obtained by SDN controller 28 using a discovery protocol such as Interior Gateway Routing Protocol, Link Layer Discovery Protocol (LLDP), Spanning Tree Protocol, or any other discovery protocol or routing protocol. SDN controller 28 can use a link-based discovery protocol, a hop-based discovery protocol, an exterior discovery protocol, and/or an interior discovery protocol to construct the physical cabling topology. SDN cabling validation engine 32 can validate the user-defined cabling plan by determining that there are no differences between the cabling plan and the physical cabling topology or, in other words, that the cabling plan matches the actual, physical topology. In response to determining that there is a difference between the user-defined cabling plan and the physical cabling topology, SDN cabling validation engine 32 can output an indication of the difference. SDN cabling validation engine 32 can generate and output an updated cabling plan that addresses the differences between the user-defined cabling plan and the physical cabling topology.

Using the techniques of this disclosure, administrator 24 can validate a set of proposed connections in a user-defined cabling plan by installing the proposed connections, activating the network devices, and running the application on SDN cabling validation engine 32. Administrator 24 can avoid troubleshooting connections issues because SDN cabling validation engine 32 will identify any differences between the user-defined cabling plan and the physical cabling topology. SDN cabling validation engine 32 is then able to inform administrator 24 of any discrepancies or missing connections so that administrator 24 can resolve the issues.

SDN controller 28 can be a logically centralized and physically distributed application. For example, SDN controller 28 can run on one or more of servers 12 in data center 10A. SDN cabling validation engine 32 can run on the same server(s) 12 as SDN controller 28, a different one of servers 12, or on a computing device outside of the computer network. SDN cabling validation engine 32 can be a module of SDN controller 28 (e.g., SDN cabling validation engine 32 can run within SDN controller 28).

SDN cabling validation engine 32 can run on the same computing device(s) as SDN controller 28 or on a separate computing device. For example, SDN cabling validation engine 32 can run on a separate computer that is coupled to user interface 26. SDN cabling validation engine 32 can receive the user-defined cabling plan via graphical user interfaces 200, 300, 400, 500, and 600 as shown in FIGS. 2-6. SDN cabling validation engine 32 can also obtain the physical cabling topology by running a discovery protocol in the computer network. SDN cabling validation engine 32 can store the user-defined cabling plan, cabling rules, the physical cabling topology, cabling plans, and/or characteristics of network devices (e.g., vendor, family, model number, physical roles, ports, speeds, IP address, MAC address) to a memory that is coupled to the computer device running SDN cabling validation engine 32.

In the operation of the computer network, SDN controller 28 already constructs a physical cabling topology of the computer network for managing the network devices in the computer network. The physical cabling topology is useful for sending data throughout the computer network. For example, a first network device in the computer network can send data to a second network device in the computer network through a series of connections using the physical cabling topology to determine the travel path for the data. SDN cabling validation engine 32 can receive data indicative of the physical cabling topology from SDN controller 28. For example, SDN cabling validation engine 32 can receive a text file that includes a list of the actual connections in the physical cabling topology. Thus, SDN cabling validation engine 32 can use the already-available physical cabling topology to validate the user-defined cabling plan in order to identify any differences. Identifying the differences between the user-defined cabling plan and the physical cabling topology can save time for administrator 24 in troubleshooting connection issues.

The configuration shown in FIG. 1 is just one example of a computer network of this disclosure. For example, a computer network may include a plurality of network devices in data center 10A that are connected as a local area network. The local area network may include part of a rack in data center 10A, an entire rack in data center 10A, multiple racks in data center 10A, or network devices across multiple locations including data center 10A. A computer network according to the techniques of this disclosure may be implemented at one physical location (e.g., any of data centers 10) or across more than one physical location (e.g., across more than one of data centers 10). SDN cabling validation engine 32 can also validate connections across a hybrid public/private computer network. The techniques of this disclosure may also be implemented in a computer network including servers 12 but without chassis switches 18 and/or TOR switches 16. In addition, the techniques of this disclosure can be implemented by a remote computer with a connection to SDN cabling validation engine 32.

FIGS. 2-6 are illustrations of example graphical user interfaces 200, 300, 400, 500, and 600 for validating a cabling plan. SDN cabling validation engine 32 shown in FIG. 1 can present any of graphical user interfaces 200, 300, 400, 500, and 600 to administrator 24 via user interface 26.

Figure 2:
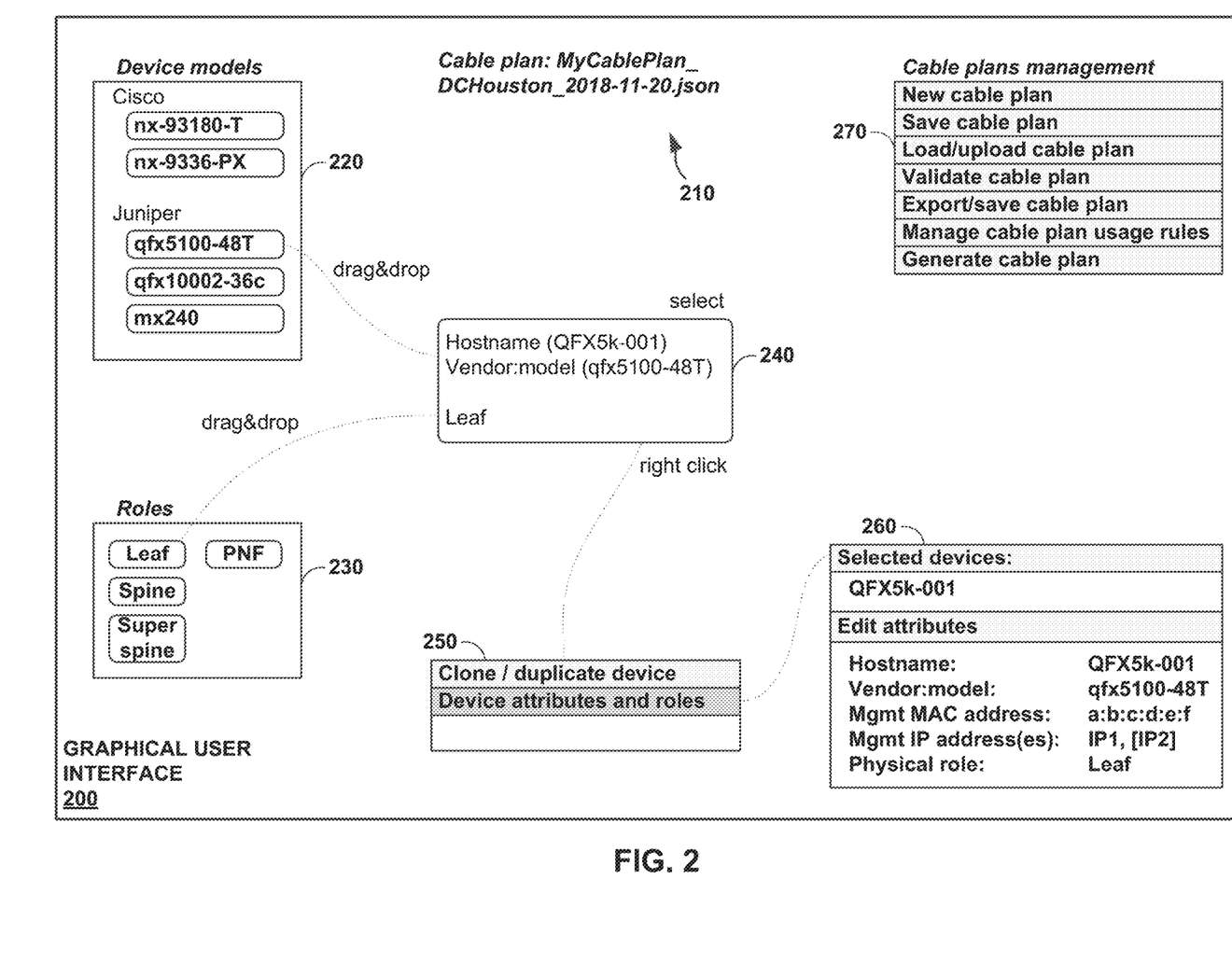
FIGS. 2-6 are illustrations of example graphical user interfaces for validating a cabling plan.

Graphical user interface 200 includes graphical representation 210 indicating the name of an uploaded file for the user-defined cabling plan. Graphical representation 220 presents a list of network devices to the user, where each item in graphical representation 220 may be grouped by vendor (e.g., manufacturer) and model number. Graphical representation 230 presents a list of roles for each network device. Graphical representation 240 includes attributes a network device so that the user can view and/or modify the attributes of the network device. A user can drag and drop models or roles from graphical representations 220 and 230 to graphical representation 240 to change the attributes of the network device shown in graphical representation 240. The user can perform the drag-and-drop operation using a mouse cursor or a touchscreen. Additionally or alternatively, the user can select models and roles from graphical representations 220 and 230 using other user inputs such as a mouse click, pressing a key or screen, or voice audio input.

Graphical representation 250 presents a menu to allow the user to duplicate the selected device or view/modify the device attributes. The user may be able to access the menu of graphical representation 250 by right-clicking graphical representation 240. Graphical representation 260 shows the attributes of the network device shown in graphical representation 240 with additional attributes, such as MAC address and IP address, not shown in graphical representation 240. Graphical representation 270 presents a menu for a user to create, validate, or export a cabling plan. A user can select options from graphical representation 270 to cause SDN cabling validation engine 32 to present graphical user interface 300, 400, 500, or 600.

From the designer user interface, a user can select the option for "create/design cable plan" to build a cable plan. The user can then select "New cable plan" from the menu in graphical representation 270 to create a new cabling plan using the main area of graphical user interface 200 (e.g., the "artboard"). By selecting "New cable plan", the user can upload a JavaScript Object Notation (JSON) file or a comma-separated values (CSV) file that includes a user-defined cabling plan (e.g., data indicating network devices and/or proposed connections).

From the list of vendors in graphical representation 220, the user can drag and drop a model number onto the main area where graphical representation 240 is positioned. When the user hovers a cursor over a device shown in the main area (e.g., graphical representation 240), graphical user interface 200 can show the device attributes such as vendor:device family:model, operating system (OS) release version, serial number (S/N) and/or hostname, management IP address(es), and/or physical role. If the user right-clicks on graphical representation 240, the user can view and/or edit the attributes such as hostname, serial number, vendor, family, and model number, OS release, management IP addresses, management MAC addresses, and/or physical roles. When the user selects "Save cable plan" from graphical representation 270, SDN cabling validation engine 32 will save the cabling plan, including the attributes of the network devices and the proposed connections, to memory.

A user can access graphical user interface 200 by running the application directly on SDN cabling validation engine 32. A user may also be able to run a web application on a remote device to access graphical user interface 200. The user can access graphical user interface 200 from a data center designer user interface by selecting "Infrastructure" and then selecting "Fabric" in a menu in the data center designer user interface.

The user can select "Load/upload cable plan" in graphical representation 270 to upload a file that includes data indicating network devices and/or data indicating proposed connections. In response to the user selecting "Load/upload cable plan", graphical user interface 200 may prompt the user for a Uniform Resource Locator (URL) address or the address of a local file to fetch a JSON file or a CSV file. Graphical representation 210 shows the uploaded file: "MyCablePlan_DCHouston_2018-11-20.json", which includes a user-defined cabling plan (e.g., data indicating network devices and/or data indicating proposed connections).

SDN cabling validation engine 32 can validate and verify the uploaded cabling plan by determining whether the cabling plan is consistent with a physical cabling topology. In other words, SDN cabling validation engine 32 compares the intent of the user set forth in the uploaded file to the reality of the physical cabling topology. For example, each proposed connection in the uploaded file may include the following data items: fromPhysicalRole, fromDeviceS/N, fromPort, toPhysicalRole, toDeviceS/N, toPort, Speed. An example proposed connection is Leaf, S/N 12345, ge-0/0/14, Spine, S/N 16347, ge-0/0/12, 40GE. This example proposed connection has a speed of forty gigahertz and is between a network device acting as a leaf with the serial number 12345 at port 0/0/14 and a QFX01 network device with the serial number 16347 at port 0/0/12. Other example proposed connections include:

Leaf, S/N 12345, ge-0/0/14, Hostname QFX01 or S/N 16347, ge-0/0/13, 40GE

Leaf, S/N 12345, ge-0/0/14, Hostname QFX01 or S/N 16347, ge-0/0/14, 40GE

Leaf, S/N 12345, ge-0/0/14, Hostname QFX02 or S/N 56223, ge-0/0/2, 40GE

Figure 3:
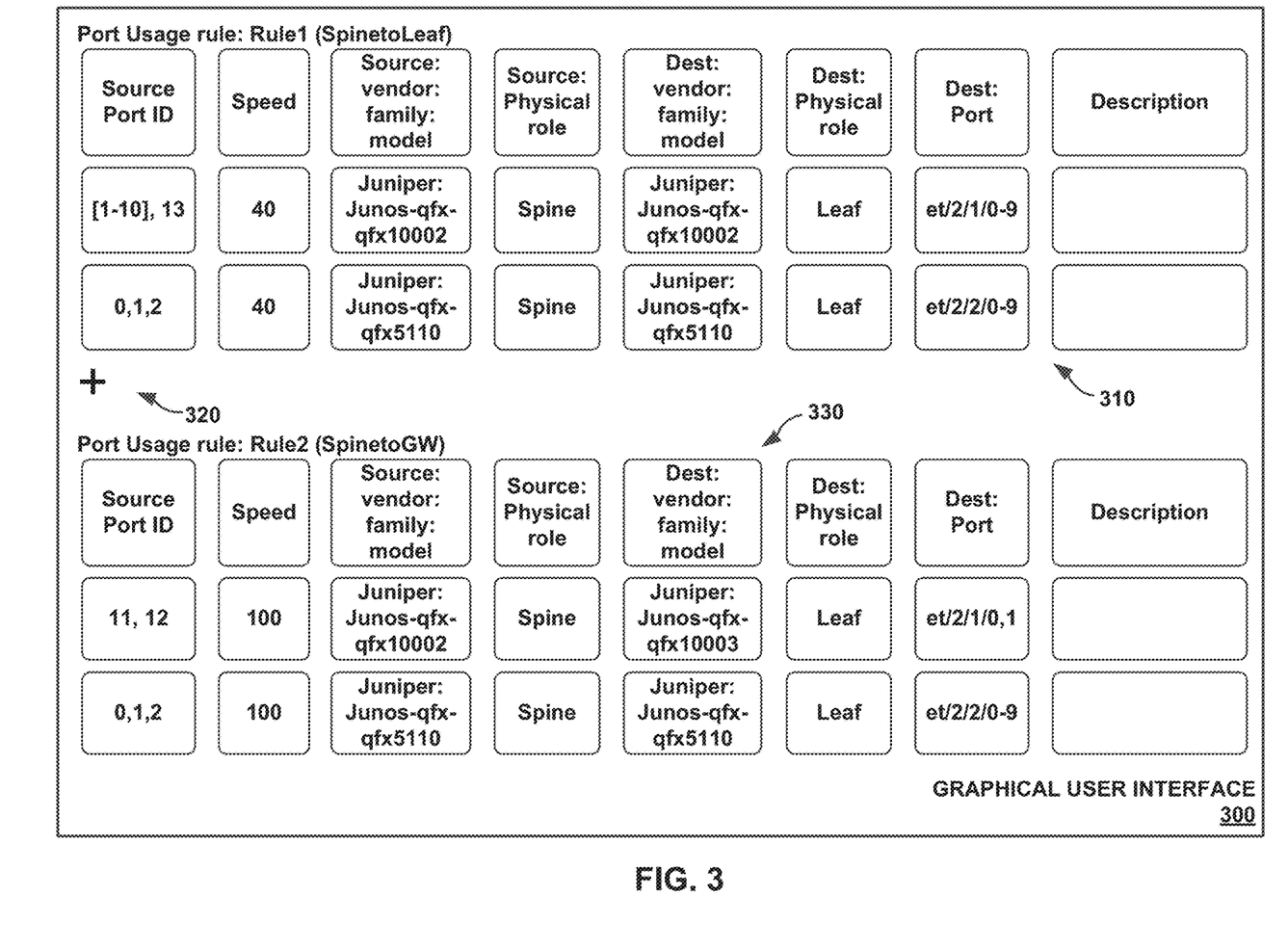

FIG. 3 shows graphical user interface 300 where a user can create cabling rules (e.g., proposed connections) by filling in the information for each rule. A user can access graphical user interface 300 by selecting "Manage cable plan rules" in the menu of graphical representation 270 shown in FIG. 2. The cabling rules shown in graphical user interface 300 are examples of a user-defined cabling plan for network devices in a computer network. A user can enter data to create a user-defined cabling plan using graphical user interface 300 as an alternative to or in addition to uploading a JSON or CSV file with the user-defined cabling plan.

A user can establish cabling rules using graphical user interface 300 to specify the physical connectivity "template" between two device types. For example, the user can create a rule specifying a proposed connection between Leaf QFX5100 and Spine QFX10002 using Port et-0/0/10 on Leaf at 40 GHz and port et-0/0/12 on Spine at 40 Ghz. Graphical representation 310 shows two proposed connections, where each proposed connection is between a spine device and a leaf device. By selecting graphical icon 320, the user can add a cabling rule. Graphical representation 330 shows two proposed connections, where each proposed connection is between a spine device and a gateway (GW) device. The user can also edit existing rules shown in graphical user interface 300. A user-defined cabling plan can include a plurality of cabling rules as shown in graphical user interface 300.

In the example shown in FIG. 3, a rule is composed of a minimum of source Port ID, source vendor:family:model, source physical role, Speed, destination vendor:family: model, destination physical role, destination port Id, and a description (shown blank in FIG. 3). A user can add new rules via graphical user interface 300, where each new rule is composed of multiple entries (e.g., up to 64 entries). Graphical user interface 300 may allow a maximum number of rules, such as 64 or 128 rules.

Figure 4:
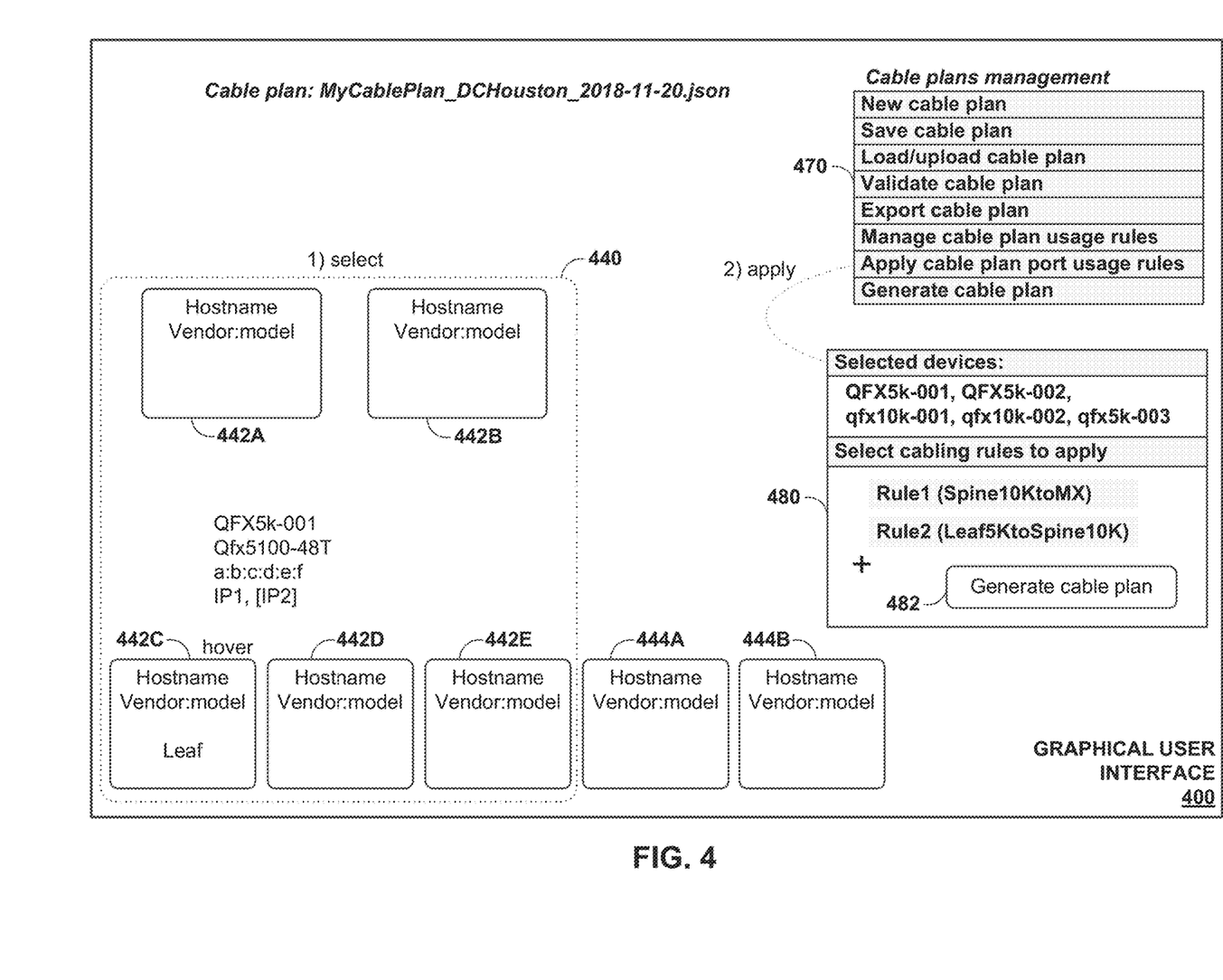

FIG. 4 shows graphical user interface 400 where a user can apply the port cabling rules from graphical user interface 300 shown in FIG. 3 to network devices shown in graphical user interface 400. By selecting "Apply cable plan port usage rules" from the menu in graphical representation 470, the user can apply port cabling rules to the selected network devices instead of dragging and dropping the cabling rules to each network device.

The user can select a subset of network devices on which to apply the port cabling rules of the user-defined cabling plan. For example, in graphical user interface 400 the user has selected network devices 442A-442E inside box 440. If the user does not select any network devices in graphical user interface 400, SDN cabling validation engine 32 can, by default, apply the port cabling rules to all of network devices 442A-442E, 444A, and 444B. In response to the user selecting "Apply cable plan port usage rules", graphical user interface 400 shows graphical representation 480, which includes a list of selected network devices and the selected cabling rules to apply. Using graphical representation 480, the user can select, add, or remove cabling rules to apply. The user can either cancel the application of the port cabling rules or apply the port cabling rules by selecting "Generate cable plan" in graphical representation 482. Responsive to selecting "Generate cable plan", SDN cabling validation engine 32 can generate graphical user interface 500 shown in FIG. 5.

Figure 5:
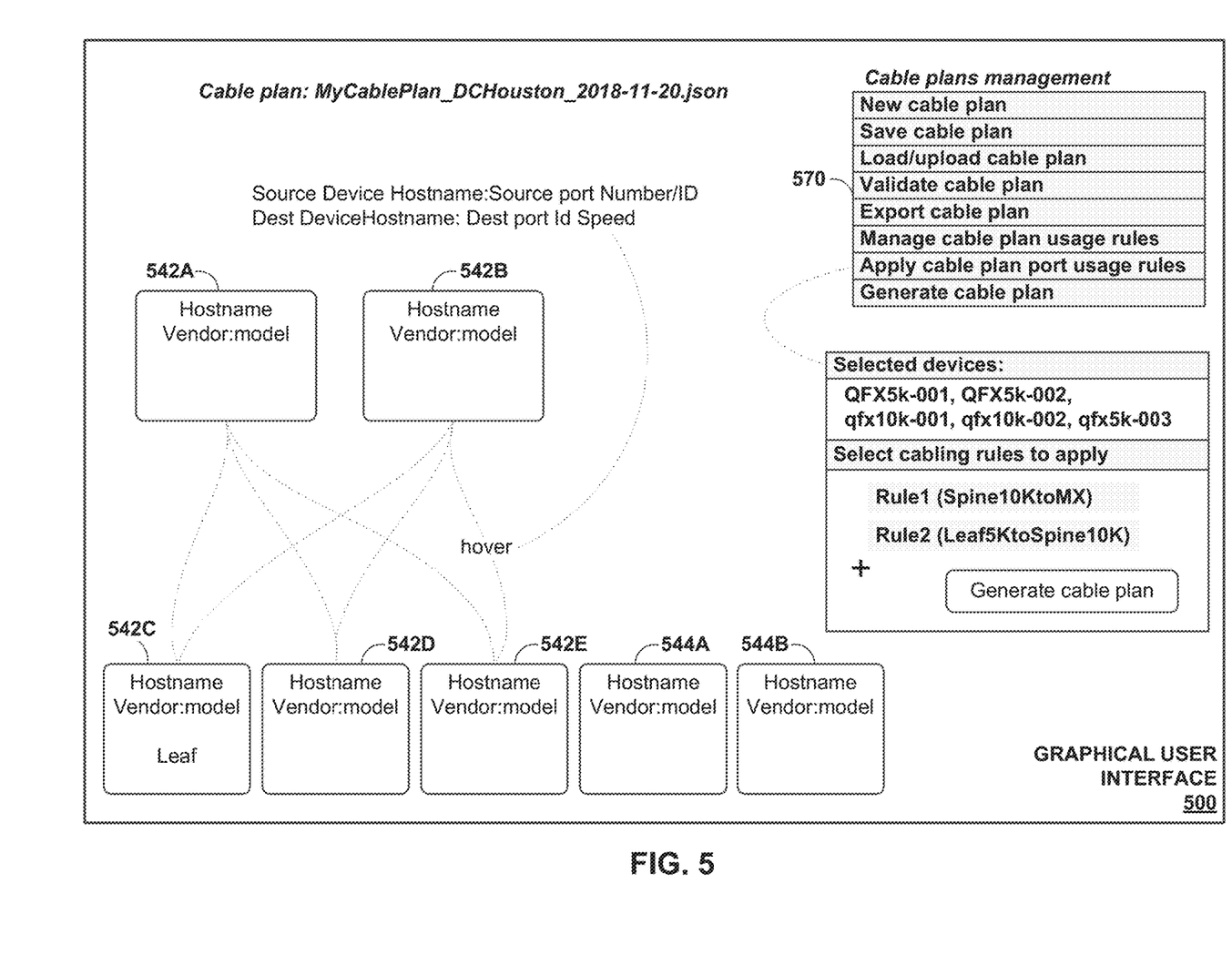

FIG. 5 shows graphical user interface 500 with the applied port cabling rules from graphical user interface 400 shown in FIG. 4. Graphical user interface 500 includes six proposed connections among network devices 542A-542E. When the cursor hovers over the proposed connection between network devices 542B and 542E, graphical user interface 500 presents the attributes of the proposed connection. The presented attributes include the hostname, port number, identification number of the source and destination devices, as well as the speed of the proposed connection. By selecting "Validate cable plan" from graphical representation 570, a user can initiate the verification process, causing SDN cabling validation engine 32 to determining whether there are any differences between the user-defined cabling plan and a physical cabling topology.

Figure 6:
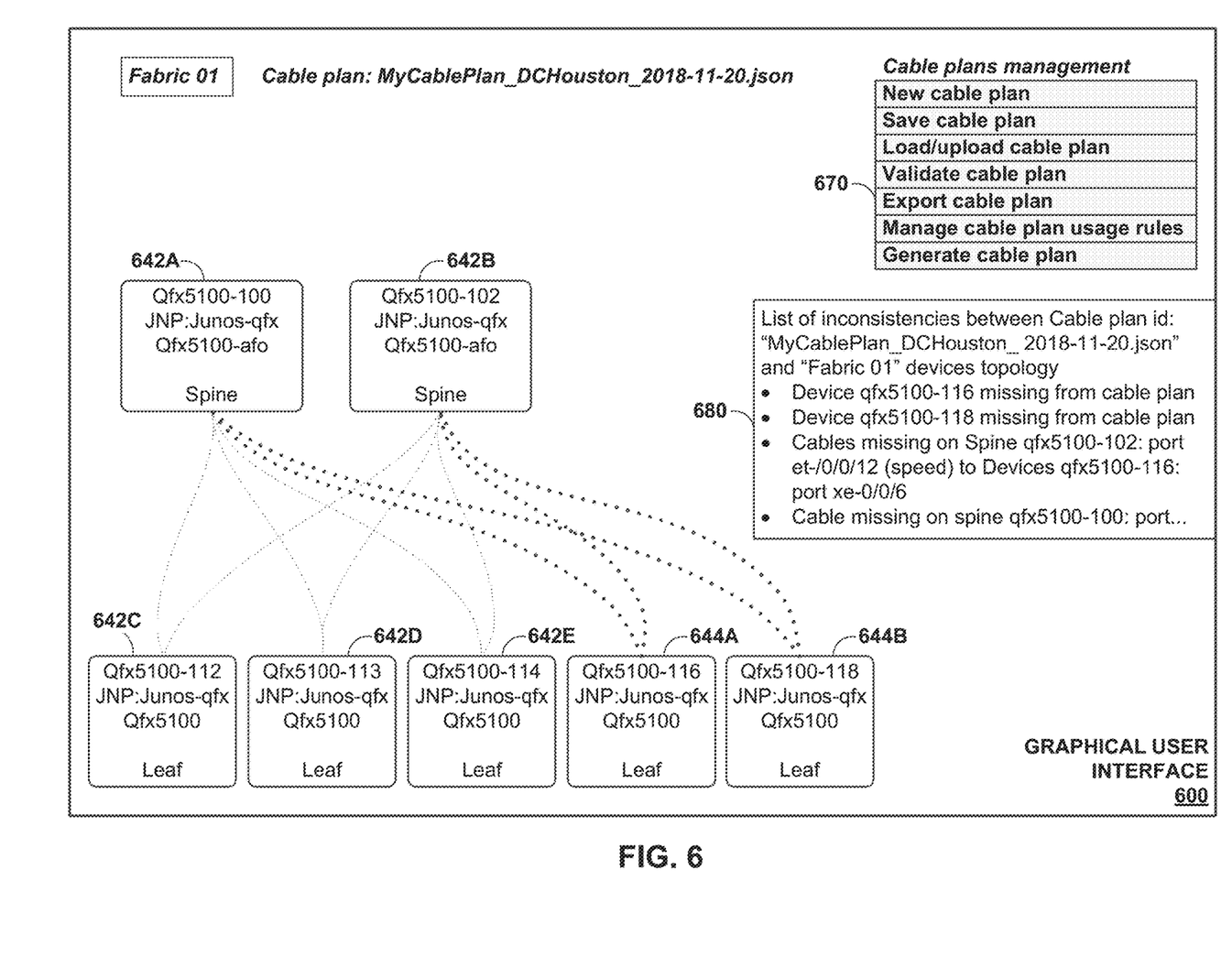

FIG. 6 shows graphical user interface 600 with indications of missing connections among the network devices. By selecting "Validate cable plan" from graphical representation 670, the user causes SDN cabling validation engine 32 to verify the consistency of the imported user-defined cabling plan with the real physical cabling topology and, in some examples, to produce an updated cabling plan. In order to validate the cabling plan, SDN cabling validation engine 32 crawls the physical topology and checks whether the uploaded cable plan is consistent with the real physical topology. When the validation process completes, SDN cabling validation engine 32 can present the physical topology of the cabled devices on graphical user interface 600 (e.g., the graphical icons for network devices 642A-642E, 644A, and 644B).

To determine the physical cabling topology, SDN controller 28 can fetch the physical adjacencies via a discovery process such as LLDP across all interfaces on the network devices in data center 10A, or even across all of data centers 10. SDN controller 28 can construct a database or a data structure including all of the network devices in the computer network as well as the actual, physical connections among the network devices. The database or data structure can include information such as the role of each network device, the vendor, family, and model number of each network device, the IP address for each network device, the MAC address for each network device, the ports on two network devices used by each connection, and/or the speed for each connection.

To create a user-defined cabling plan, the user can use the "Load/upload cable plan" option in graphical representation 670 to import a cable plan file. Graphical user interface 600 may provide the user with the ability to swap or toggle between the two views (e.g., fetched adjacencies and imported user-defined cabling plan). Graphical user interface 600 can present a real physical topology diagram with graphical icons showing the network devices, as determined from the discovery process. Graphical user interface 600 can also present indications of the differences between the real physical topology diagram and the imported cable plan.

SDN cabling validation engine 32 can also present indications of incorrect or missing connections on graphical user interface 600. For example, SDN cabling validation engine 32 can present indications of mismatches between network devices, mismatches in the device/port tuple between the imported file and the real topology, mismatches in device attributes (e.g., wrong vendor: device family:device model), mismatches in the OS releases for network devices, mismatches in the port speed for a proposed connection.

For example, as shown in the example of FIG. 6, SDN cabling validation engine 32 determines that the four connections are missing from the cabling plan of graphical user interface 500 shown in FIG. 5. SDN cabling validation engine 32 determines that the connections among network devices 642A, 642B, 644A, and 644B are missing from the user-defined cabling plan. In response to this determination, SDN cabling validation engine 32 present graphical representation 680, which includes text indicating details of the missing connections and missing network devices. The details include the network devices for each connection, the vendor/family/model for each network device, the port for each connection, and the speed for each connection. SDN cabling validation engine 32 can also present details of incorrect connections in the cabling plan in graphical representation 680.

By selecting "export cable plan" from graphical representation 670, the user causes SDN cabling validation engine 32 to locally save or export the updated cabling plan based on the real physical topology. SDN cabling validation engine 32 can output the updated cabling plan including details of the incorrect or missing network devices, details of the missing connections, and/or details of the incorrect connections. The updated cabling plan may include the actual physical cabling topology with any corrections that are needed for the actual connections.

Figure 7:
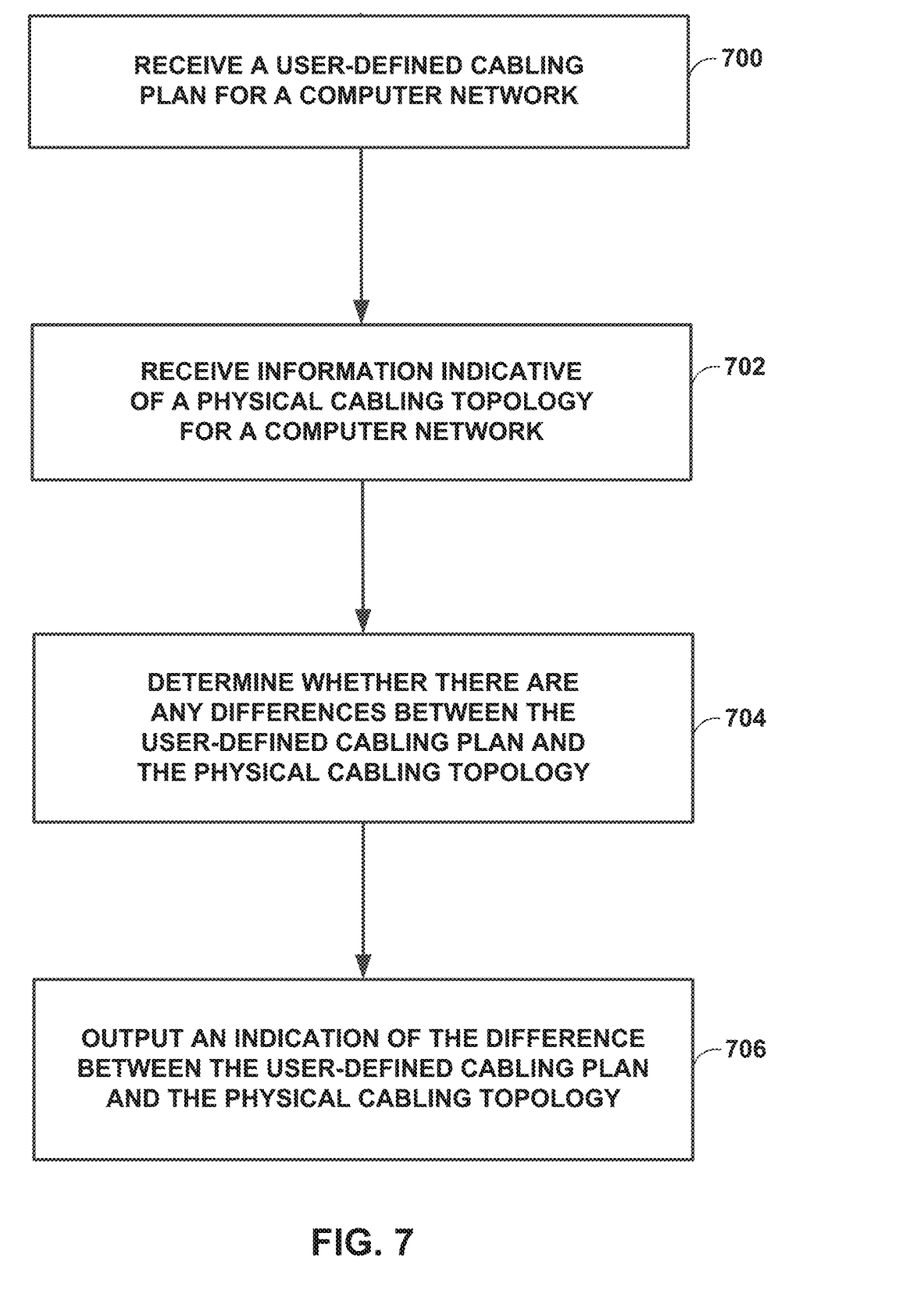
FIG. 7 is a flowchart showing an example operation of validating a cabling plan.

FIG. 7 is a flowchart showing an example operation of validating a cabling plan. The example techniques of FIG. 7 are described with reference to SDN cabling validation engine 32 shown in FIG. 1, but other components may also perform similar techniques.

In the example of FIG. 7, SDN cabling validation engine 32 receives a user-defined cabling plan for a computer network (700). A user can upload the cabling plan through graphical user interface 200 using an option in the menu of graphical representation 270. The user can also create the cabling plan using graphical user interface to create port cabling rules.

In the example of FIG. 7, SDN cabling validation engine 32 receives information indicative of physical cabling topology for the computer network (702). Using the discovery protocol, SDN controller 28 maps out all of the network devices and the connections among the network devices in the computer network. SDN controller 28 can determine the attributes of each connections, where the attributes include the speed of each connection, the port identification numbers for each connection, and attributes of the network devices on the ends of each connection. SDN cabling validation engine 32 can receive a data file including the physical cabling topology from SDN controller 28.

In the example of FIG. 7, SDN cabling validation engine 32 determines whether there are any differences between the user-defined cabling plan and the physical cabling topology (704). SDN cabling validation engine 32 can determine a difference between the user-defined cabling plan and the physical cabling topology by determining that an actual connection in the user-defined cabling plan is missing from the physical cabling topology, as shown in graphical user interface 600. SDN cabling validation engine 32 can also determine that an attribute of an actual connection does not match an attribute of a corresponding proposed connection of the physical cabling topology.

In the example of FIG. 7, SDN cabling validation engine 32 outputs an indication of the difference between the user-defined cabling plan and the physical cabling topology (706). SDN cabling validation engine 32 can present an indication of the difference(s) by presenting graphical representation 680 including the details of each difference. For example, graphical representation 680 identifies two network devices (644A and 644B) that are present in the physical cabling topology but are missing from the user-defined cabling plan. Graphical representation 680 also identifies the missing connections for two of the network devices in the user-defined cabling plan (642A and 642B). Graphical representation 680 can present details such as port identification numbers and speeds for the missing connection. In addition, SDN cabling validation engine 32 can present attributes of connections that are different in the user-defined cabling plan and the physical cabling topology. For example, if the user-defined cabling plan defines a connection on port 1 of a network device, but the physical cabling topology identifies the connection on port 1 of the network device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more DSPs, general purpose microprocessors, ASICs, field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various examples of the invention have been described. These and other examples are within the scope of the following claims.

What is claimed is:

1. A method comprising:
receiving, by a software-defined networking (SDN) validation engine, a user-defined plan indicating one or more proposed connections for network devices of a computer network, the user-defined plan including:
port identification information for one or more of the network devices;
a speed for a proposed connection of the one or more proposed connections; and
a device attribute of one or more of the network devices;
determining, by an SDN controller for the computer network using a discovery protocol, one or more actual connections of the network devices, wherein the SDN controller is logically centralized and physically distributed and configured to construct an overlay virtual network on an underlay network formed by the physical cabling of the network devices;

determining, by the SDN validation engine, a difference between the one or more proposed connections of the user-defined plan and the one or more actual connections by determining that a first proposed connection in the user-defined plan is missing from the one or more actual connections;

generating, by the SDN validation engine, an updated plan including details of the first proposed connection that is missing from the one or more actual connections; and outputting, by the SDN validation engine, the updated plan.

2. The method of claim 1, wherein determining the difference between the user-defined plan and the one or more actual connections further comprises determining one or more of:

a mismatch between two connected network devices of the network devices in the computer network;

a mismatch in a port of a first network device indicated in the user-defined plan and an actual port of the first network device according to the one or more actual connections;

a mismatch in an attribute for a second network device indicated in the user-defined plan and an attribute of the second network device according to the one or more actual connections; or a mismatch in an operating system release for a third network device of the network devices indicated in the user-defined plan and an operating system release for the third network device according to the one or more actual connections.

3. The method of claim 1, wherein determining the one or more actual connections comprises constructing, using a Link Layer Discovery Process, a database of the network devices and the one or more actual connections within the computer network.

4. The method of claim 1, further comprising prompting a user to select a rule for a first network device and a second network device of the network devices by prompting the user to input:

a port identification number on the first network device;
a port identification number on the second network device;
a speed for a connection between the first network device and the second network device;
a model number for the first network device;
a model number for the second network device;
a physical role for the first network device; and
a physical role for the second network device.

5. The method of claim 4, wherein receiving the user-defined plan comprises receiving user input indicating user selections for the port identification number for the first network device, the port identification number for the second network device, the speed for the connection between the first and second network devices, the model number for the first network device, the model number for the second network device, the physical role for the first network device, and the physical role for the second network device.

6. The method of claim 1, wherein receiving the user-defined plan comprises receiving a JavaScript Object Notation file or a comma-separated values file indicating the user-defined plan.

7. The method of claim 1, wherein determining the difference between the user-defined plan and the one or more actual connections comprises determining that an attribute of a second actual connection of the one or more actual connections does not match an attribute of a corresponding proposed connection of the one or more proposed connections.

8. The method of claim 1, wherein determining the difference between the user-defined plan and the one or more actual connections comprises determining one or more of a mismatch in a port speed for a proposed connection of the one or more proposed connections and a port speed for a corresponding actual connection of the one or more actual connections.

9. The method of claim 1, further comprising presenting a graphical user interface including a graphical representation of a first network device of the network devices in the computer network, wherein receiving the user-defined plan comprises determining that a user has selected a set of attributes for the first network device by performing at least one drag-and-drop operation on the graphical user interface.

10. The method of claim 1, further comprising presenting a graphical user interface including a graphical representation of a first network device and a second network device of the network devices, wherein receiving the user-defined plan comprises determining that a user has selected a port cabling rule for the first and second network devices by performing at least one drag-and-drop operation on the graphical user interface.

11. The method of claim 10, wherein the graphical representation is a first graphical representation, and wherein presenting the graphical user interface comprises:

presenting a second graphical representation of a proposed connection between the first and second network devices; and presenting attributes of the proposed connection between the first and second network devices in response to determining that a cursor is hovering over the proposed connection.

12. A system comprising:

a plurality of network devices that form a computer network and that are interconnected by physical cabling;

a software-defined networking (SDN) controller configured to determine, using a discovery protocol, one or more actual connections of the plurality of network devices in the computer network, wherein the SDN controller is logically centralized and physically distributed and configured to construct an overlay virtual network on an underlay network formed by the physical cabling; and an SDN validation engine configured to:
  receive a user-defined plan indicating one or more proposed connections for the plurality of network devices, the user-defined plan including:
    port identification information for one or more of the plurality of network devices;
    a speed for a proposed connection of the one or more proposed connections; and
    a device attribute of one or more of the plurality of network devices;
  receive information indicative of the one or more actual connections;
  determine a difference between the one or more proposed connections of the user-defined plan and the one or more actual connections by determining that a first proposed connection in the user-defined plan is missing from the one or more actual connections;
  generate an updated plan including details of the first proposed connection that is missing from the one or more actual connections; and
  output the updated plan.

13. The system of claim 12, wherein the SDN validation engine is configured to determine the difference between the user-defined plan and the one or more actual connections by determining that an attribute of a second actual connection of the one or more actual connections does not match an attribute of a corresponding proposed connection of the one or more proposed connections.

14. The system of claim 12, wherein the SDN validation engine is configured to determine the difference between the user-defined plan and the one or more actual connections by determining:
- a mismatch between two connected network devices of the plurality of network devices in the computer network;
- a mismatch in a port of a first network device indicated in the user-defined plan and an actual port of the first network device according to the one or more actual connections;
- a mismatch in an attribute for the second network device indicated in the user-defined plan and an attribute of the second network device according to the plurality of actual connections;
- a mismatch in an operating system release for a third network device of the plurality of network devices indicated in the user-defined plan and an operating system release for the third network device according to the one or more actual connections; or
- a mismatch in a port speed for a proposed connection of the one or more proposed connections and a port speed for a corresponding actual connection of the one or more actual connections.

15. The system of claim 12, wherein the SDN controller is configured to determine the one or more actual connections by constructing, using a Link Layer Discovery Process, a database of the plurality of network devices and the one or more actual connections within the computer network.

16. The system of claim 12, wherein the SDN validation engine is further configured to prompt a user to select a rule for a first network device and a second network device of the plurality of network devices by prompting the user to input:
- a port identification number on the first network device;
- a port identification number on the second network device;
- a speed for a connection between the first network device and the second network device;
- a model number for the first network device;
- a model number for the second network device;
- a physical role for the first network device; and
- a physical role for the second network device.

17. The system of claim 16, wherein the SDN validation engine is configured to receive the user-defined plan by receiving user input indicating user selections for the port identification number for the first network device, the port identification number for the second network device, the speed for the connection between the first and second network devices, the model number for the first network device, the model number for the second network device, the physical role for the first network device, and the physical role for the second network device.

18. The system of claim 12, wherein the SDN validation engine is configured to receive the user-defined plan in a JavaScript Object Notation file or a comma-separated values file.

19. A non-transitory computer-readable storage medium comprising instructions for causing programmable processing circuitry to:
- receive a user-defined plan indicating one or more proposed connections for network devices of a computer network, the user-defined plan including:
  - port identification information for one or more of the network devices;
  - a speed for a proposed connection of the one or more proposed connections; and
  - a device attribute of one or more of the network devices;
- receive information indicative of a one or more actual connections determined by a software-defined networking (SDN) controller using a discovery protocol, wherein the one or more actual connections include connections of the network devices, and wherein the SDN controller is logically centralized and physically distributed and configured to construct an overlay virtual network on an underlay network formed by physical cabling of the network devices;
- determine a difference between the one or more proposed connections of the user-defined plan and the one or more actual connections by determining that a first proposed connection in the user-defined plan is missing from the one or more actual connections;
- generate an updated plan including details of the first proposed connection that is missing from the one or more actual connections; and
- output the updated plan.

20. The non-transitory computer-readable storage medium of claim 19, wherein the instructions to determine the difference between the user-defined plan and the one or more actual connections further comprise instructions to
- determine that an attribute of a second actual connection of the one or more actual connections does not match an attribute of a corresponding proposed connection of the one or more proposed connections.

* * * * *